Patented Dec. 14, 1948

2,456,177

UNITED STATES PATENT OFFICE 2,456,177

N-ALKYL POLYMERIC AMIC ACIDS AND COATING COMPOSITIONS CONTAINING THEM

Martin E. Cupery, Wilmington, Del., assignor to E. I. du Pont de Nemours & Company, Wilmington, Del., a corporation of Delaware No Drawing. Application April 24, 1946, Serial No. 664,703

5 Claims. (Cl. 260—78)

This invention relates to dispersing agents and more particularly to new N-monoalkyl substituted polymeric amic acids and methods for their preparation.

An object of this invention is to provide new N-monoalkyl substituted polymeric amic acids and methods for their preparation. A further object of this invention is to provide new polymeric amic acids whose water-soluble salts, such as the ammonium salts, are excellent dispersing agents for varnishes, oils and resins in alkaline aqueous media. Another object is to provide novel dispersing agents and methods for their preparation. An additional object is to provide film-forming compositions containing the novel dispersing agents and methods of preparing water-resistant coatings therefrom. Other objects will appear hereinafter.

These objects are accomplished by new N-substituted polymeric amic acids obtainable by reacting one mole equivalent of a polymeric polycarboxylic acid anhydride with from 0.1 to 0.9 mole equivalent of an aliphatic primary amine containing from 12 to 18 carbon atoms in the aliphatic chain and with from 0.9 to 0.1 mole equivalent of a member of the class consisting of ammonia and short chain aliphatic amines containing less than seven carbon atoms in the chain. The new products of this invention include N-monoalkyl substituted polymeric amic acids in which about 10 to 90% of the amide nitrogen atoms have a monovalent aliphatic hydrocarbon substituent having 12 to 18 carbon atoms in the chain and the residual amide nitrogen atoms are attached to a member of the group consisting of a monovalent short chain aliphatic hydrocarbon substituent and hydrogen. The amide nitrogen-free non-oxo carbonyl groups in said N-monoalkyl substituted polymeric amic acids are attached to an OH radical.

By "short chain aliphatic hydrocarbon substituent" is meant an alkyl group containing less than seven carbon atoms. Examples of such amines are methylamine, ethylamine, propylamine, amylamine, isobutylamine, hexylamine, and the like.

These new N-monoalkyl substituted polymeric amic acids are the products obtained by amidating interpolymers of an ethylene-alpha, beta-dicarboxylic acid anhydride and a polymerizable organic compound containing an ethylenic double bond as the sole aliphatic carbon-to-carbon unsaturation. The interpolymers of styrene/maleic anhydride are particularly preferred for use in this invention to form the new N-monoalkyl substituted polymeric amic acids.

A preferred method of preparing these new products is by reacting one mole of the polymeric polycarboxylic acid anhydride with from 0.1 to 0.9 mole of an aliphatic primary amine containing from 12 to 18 carbon atoms in the aliphatic chain and then reacting the residual acid anhydride groups either with ammonia or with a short chain aliphatic amine containing less than seven carbon atoms in the chain. The equivalent molecular weight of the polymeric polycarboxylic acid anhydride is considered as being that of the structural unit. The amic acid thus formed may then be converted to water-soluble ammonium or basic amine salt by reaction with aqueous or gaseous ammonia or with a water-soluble basic amine.

By "basic amine" is meant an amine having an ionization constant value greater than $1 \times 10^{-6}$, when measured at 25° C.

By "water-soluble amine" is meant an amine which is soluble to the extent of at least 5 parts per hundred parts of water at 25° C.

Examples of suitable water-soluble basic amines are methylamine, ethylamine, diethylamine, ethanolamine, hydrazine, piperidine, morpholine, and the like.

The polymeric polycarboxylic acid anhydrides are obtainable by reacting on mole of an ethylene-alpha, beta-dicarboxylic acid anhydride with one mole of another polymerizable organic compound containing an ethylenic double bond as the sole aliphatic carbon-to-carbon unsaturation, as described in U. S. Patents 2,047,398 issued July 14, 1936, and 2,378,629 issued June 19, 1945. Polymeric polycarboxylic acid anhydrides can be thus obtained ranging in viscosity from 0.2 to 5000 centipoises at 25° C., when measured as 15% solutions in methyl ethyl ketone. The polymeric polycarboxylic acid anhydrides which range in viscosity from 2 to 700 centipoises at 25° C., are preferred because they yield amic acids which contain a high proportion of long chain N-alkyl substitution groups and still retain good solubility in dilute ammonium hydroxide. These polymeric polycarboxylic acid anhydrides are obtained by controlling the degree of condensation between ethylene alpha-beta dicarboxylic anhydride and the polymerizable organic compound of the aforementioned type. By dilute ammonium hydroxide is meant aqueous ammonium hydroxide containing 0.5 to 1% NH₃ by weight.

The presence of long chain, N-alkyl substituent groups greatly improves the film-forming properties of these polymeric amic acids and the power of their water-soluble ammonium and amine salts to disperse water insoluble oils or resins in alkaline aqueous media. The proportion of long-chain substitution must be regulated, depending upon the molecular weight of the polymeric anhydride which is employed, to obtain desired emulsifying and film properties combined with good solubility in water of their ammonium and amine salts. The minimum long chain substitution below which desired dispersion properties of the water-soluble ammonium salts decrease rapidly is at about 10% of the total amide groups present in the polymeric structure. On the other hand, with low viscosity polymers satisfactory solubility in dilute ammonium hydroxide falls off rapidly when more than about 90% of the total amide groups in the polymeric amic acid have long chain alkyl substitution groups. Low, medium and high viscosity polymers require long chain substituent groups on 20% to about 60% of the total amide groups in order to obtain optimum desired effects.

This invention is further illustrated by the following examples in which the amounts, unless otherwise stated, are expressed in parts by weight.

*Example I*

To 10.5 parts of a styrene/maleic anhydride polymer, (having a viscosity of 6.2 centipoises at 25% solids in methyl ethyl ketone at 25° C.), dissolved in 130 parts of methyl ethyl ketone, is added a solution of 13 parts of n-octadecylamine dissolved in an equal amount of warm methyl ethyl ketone. The solution is stirred while warming gradually to 50° C. and is then allowed to stand for about 20 hours. Upon addition of about 20 parts of concentrated ammonium hydroxide and stirring, a finely divided precipitate is formed. The product is separated by filtration, washed several times with acetone or benzene and finally air dried. The residual product, amounting to 20.9 parts, corresponds to one containing N-octadecyl substituent groups on 80% of the total amide groups in the polymeric amic acid structure. One part of the product dissolves slowly in 99 parts of dilute ammonium hydroxide on warming to 75 to 80° C. for about 15 minutes to give a smooth slightly viscous solution. Broadcloth treated with this solution and heated at 140° C. for 5 minutes (2 to 4% by weight of amic acid retention) shows excellent water-repellency. The water-repellency effect is not removed by washing with soap and water at room temperature.

*Example II*

To a solution of 51 parts of a styrene/maleic anhydride polymer, (having a viscosity of 6.2 centipoises at 25% solids in methyl ethyl ketone at 25° C.), dissolved in a solvent mixture consisting of 80 parts of methyl ethyl ketone and 80 parts of benzene, is added with rapid stirring a solution of 24 parts of n-octadecylamine in 50 parts of methyl ethyl ketone and 50 parts of benzene. Slight cooling is applied to maintain a solution temperature below 36° C. After standing for 48 hours, a solution of 12 parts of butylamine in 25 parts of methyl ethyl ketone and 25 parts of benzene is added with stirring. The solution rapidly becomes viscous and finally sets-up to a fragil gel. After standing several hours, 35 parts of concentrated ammonium hydroxide (28% $NH_3$) is slowly added with agitation, the resulting product is separated by filtration, washed with acetone, and air-dried. A finely divided white product, amounting to 86 parts, is obtained. The product, based on reagent weights, is the ammonum salt of the N-alkyl styrene/maleamic acid polymer in which about 50% of the amide groups have an n-octadecyl substitution group and the residual amide groups have n-butyl substitution groups. The product is readily soluble in dilute ammonium hydroxide, giving clear solutions which foam strongly on shaking. A 2% solution of the product has a surface tension of about 55 dynes per centimeter. Films of the product, obtained by evaporation of 10% aqueous solutions on a glass plate are smooth, glossy, clear, transparent, and colorless. Upon baking in air at 100° C. for one-half hour such films become hard and are totally insoluble in water. Weakly alkaline solutions of the product, at pH 8 to 9 readily disperse varnishes and alkyd resins to give compositions useful in the formulation of water dispersion paints. Such paints have excellent dispersion stability and on air drying or baking rapidly develop high resistance to water.

*Example III*

A polymeric amic acid ammonium salt, in which 20% of the total amide groups have n-octadecyl substitution and the residual amide groups have n-butyl groups attached to the nitrogen atom, is prepared by the method of Example I, by reacting the same low viscosity styrene/maleic anhydride polymer first with a calculated quantity (0.2 mole equivalent) of n-octadecylamine and then with the required amount (0.8 mole equivalent) of n-butylamine, followed by treatment with excess gaseous ammonia. The product is soluble in dilute aqueous ammonium hydroxide and such solutions have excellent emulsifying properties for varnishes, oils and resins. Pigmented varnishes or alkyd resins dispersed with the above product form emulsion paints which dry rapidly to give smooth, water resistant finishes which show high resistance to weathering conditions. These finishes have exceptionally good resistance to mildewing and in this respect are superior to corresponding compositions based on casein as the dispersing agent and stabilized with mildew inhibitors.

*Example IV*

A polymeric amic acid ammonium salt prepared as described in Example III but made from a high viscosity styrene/maleic anhydride polymer (viscosity about 650 centipoises as a 15% solution in methyl ethyl ketone at 25° C.) is soluble at 5% solids concentration in warm dilute ammonium hydroxide of pH 9.5. Upon cooling to room temperature (25° C.) this solution forms a soft, viscous gel. Pigmented varnish dispersions made with this agent used at 5% concentration in warm, dilute ammonium hydroxide have excellent storage stability at ordinary temperature and upon warming, or on dilution with water, may readily be applied as finishes over various substrates.

At 2% solids, solutions of the above mentioned product in dilute ammonium hydroxide do not gel at ordinary temperatures. Films obtained from such solutions on air drying for several hours develop high resistance to water.

*Example V*

To 205 parts of a styrene/maleic anhydride polymer, (which has a viscosity of 14 centipoises when dissolved at 25% solids in methyl ethyl ketone at 25° C.), dissolved in 2000 parts methyl ethyl ketone, is added with stirring a solution of 148 parts of n-dodecylamine in 300 parts methyl ethyl ketone. After stirring at room temperature for about four hours the solution is heated to 50° to 55° C. and held at this temperature until all of the n-dodecylamine has reacted. The extent of reaction may be determined by removing a small portion of the reaction mixture and adding it to dilute ammonium hydroxide. In this test the product should be completely soluble and give only a faintly cloudy solution. When the reaction of n-dodecyl amine is complete, a solution of 14.6 parts of n-butyl amine in 160 parts methyl ethyl ketone is added, with stirring, at a solution temperature of 45° to 50° C. A viscous, homogeneous solution is obtained which gels on cooling. The warm solution is poured slowly into about 4000 parts of an aliphatic hydrocarbon solvent such as gasoline. The amic acid reaction product is thereby precipitated. The product has dodecyl groups substituted on the nitrogen atoms of about 80% of the total amide groups in the polymer and the residual amide groups have n-butyl substitution groups.

The product prepared as described above dissolves readily in warm dilute ammonium hydroxide to give solutions which at 10% solids concentration have low viscosity and a somewhat cloudy appearance. Such solutions readily disperse varnishes and alkyd resins and pigmented compositions based on such dispersions have excellent properties as finishes for wall-paper and the like. A pigment-varnish dispersion comprising 3 parts varnish and 1 part of the above polymeric amic acid used as a 10% solution in dilute ammonium hydroxide at pH 8.5, 20 parts of a pigment composition (5 parts TiO2, 9 parts china clay, 4 parts asbestine, 2 parts mica) and 15 parts of water, prepared by mixing and milling for 2 hours, has excellent properties as a wall finish. The above paint composition brushed over a surface air dries rapidly and after overnight drying may be washed vigorously with soapy water without serious erosion of the finish. A corresponding pigment-varnish emulsion paint made with casein in place of the above mentioned agent, has exceedingly poor wet scrub resistance even after air drying for several days.

In the formulation of the composition of this invention it is desirable to select the acid anhydride interpolymer and the amine or mixture of amines in order to obtain the desired combination of properties. In general, the lower the viscosity of the polymeric polycarboxylic acid anhydride, the longer the chain length of alkyl amine which can be used in preparing the N-monosubstituted amic acids and the greater the extent of substitution which can be made without adversely affecting the desired solubility. If too high a viscosity polymeric polycarboxylic anhydride is used in conjunction with an excessive amount of a long chain primary aliphatic amine, products are obtained whose ammonium and amine salts are less readily soluble in water. It is desirable, therefore, to balance the viscosity of the polymeric polycarboxylic acid with the chain length of the primary alkylamine and the proportion used, in order to obtain products whose ammonium or basic amine salts are readily soluble in water. It is preferred to use products made from low to medium viscosity styrene/maleic anhydride interpolymers (i. e. products having viscosities from 0.2 to 600 centipoises at 25° C. when measured as 15% solutions in methyl ethyl ketone) having from 20 to 60% of the amide groups with long chain alkyl substituents and the residual amide groups being unsubstituted or having short chain alkyl substituents, e. g., isopropyl or butyl groups.

To obtain products having the best solubility characteristics, it is usually desirable to employ a moderately low molecular weight styrene/maleic anhydride polymer. For use as a dispersing agent, it is best to employ a styrene/maleic anhydride polymer of medium viscosity, if the material to be dispersed is castor oil. If the product which is to be dispersed is a varnish, or wax such as paraffin wax, then it is advantageous to employ a high viscosity styrene/maleic anhydride polymer. By low molecular weight polymer is meant a polymer which as a 15% solution in methyl ethyl ketone at 25° C. has a viscosity between 0.2 and 50 centipoises. By medium viscosity is meant that the polymer when measured under the same conditions has a viscosity between 50 and 600 centipoises and by high viscosity is meant a viscosity under the same conditions in excess of 600 centipoises.

As previously stated, the N-substituted polymeric amic acids of this invention in the form of their water-soluble ammonium and basic amine salts are suitable as dispersing agents for oils, waxes, varnishes, pigments, resins, and the like in alkaline aqueous media. They also form films which are superior in flexibility to those obtained with corresponding short chain N-alkyl amic acids.

As many apparently widely different embodiments of this invention may be made without departing from the spirit and scope thereof, it is to be understood that I do not limit myself to the specific embodiments thereof except as defined in the appended claims.

I claim:

1. An N-monoalkyl substituted amic acid of the interpolymer of an ethylene-alpha, beta-dicarboxylic acid anhydride and a polymerizable organic compound containing an ethylenic double bond as the sole aliphatic carbon-to-carbon unsaturation, in which from 10 to 90% of the amide nitrogen atoms are attached to a monovalent alkyl substituent having 12 to 18 carbon atoms in the chain, the residual amide nitrogen atoms being attached to a member of the group consisting of a monovalent short chain alkyl substituent of less than seven carbon atoms and hydrogen.

2. An N-monoalkyl subsituted polymeric styrene/maleamic acid in which from 20 to 90% of the amide nitrogen atoms are attached to a monovalent alkyl substituent having 12 to 18 carbon atoms in the chain, the residual amide nitrogen atoms being attached to a member of the group consisting of a monovalent short chain alkyl substituent of less than seven carbon atoms and hydrogen.

3. An N-monoalkyl substituted polymeric styrene/maleamic acid in which from 10 to 90% of the amide nitrogen atoms are attached to an n-octadecyl group, the residual amide nitrogen atoms being attached to an n-butyl group.

4. An N-monoalkyl substituted polymeric amic acid as set forth in claim 5 in which said polycarboxylic acid anhydride is the interpolymer of styrene with maleic anhydride which has a viscosity from 2 to 700 centipoises at 25° C., when measured as a 15% solution in methyl ethyl ketone.

5. An N-monoalkyl substituted polymeric styrene/maleamic acid in which 50% of the amide nitrogen atoms are attached to an n-octadecyl group, the residual amide nitrogen atoms being attached to an n-butyl group.

MARTIN E. CUPERY.

REFERENCES CITED

The following references are of record in the file of this patent:

UNITED STATES PATENTS

| Number | Name | Date |
|---|---|---|
| 2,279,410 | Nadeau et al. | Apr. 14, 1922 |
| 2,313,565 | McDowell et al. | Mar. 9, 1943 |
| 2,356,879 | Pense et al. | Aug. 29, 1944 |
| 2,375,960 | Stoops et al. | May 15, 1945 |